May 29, 1934.  C. A. LORENZEN  1,960,643
BACON SKINNING MACHINE
Filed April 1, 1932  2 Sheets-Sheet 2
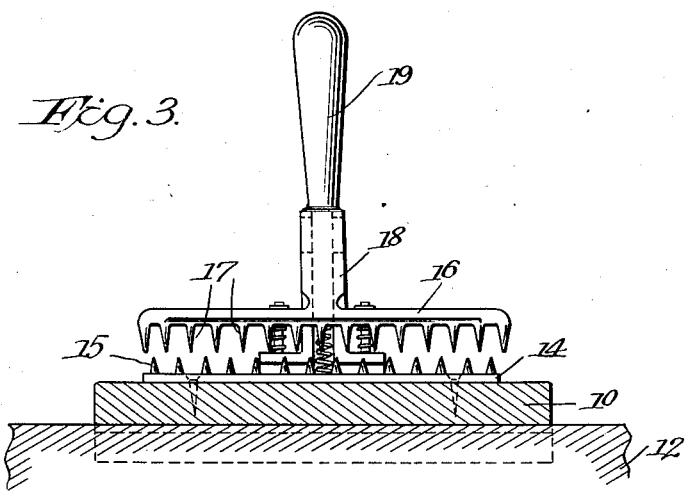
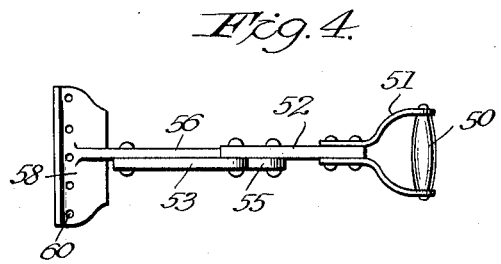
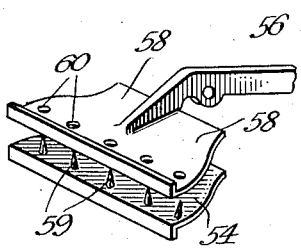
Inventor
Christ A. Lorenzen Patented May 29, 1934

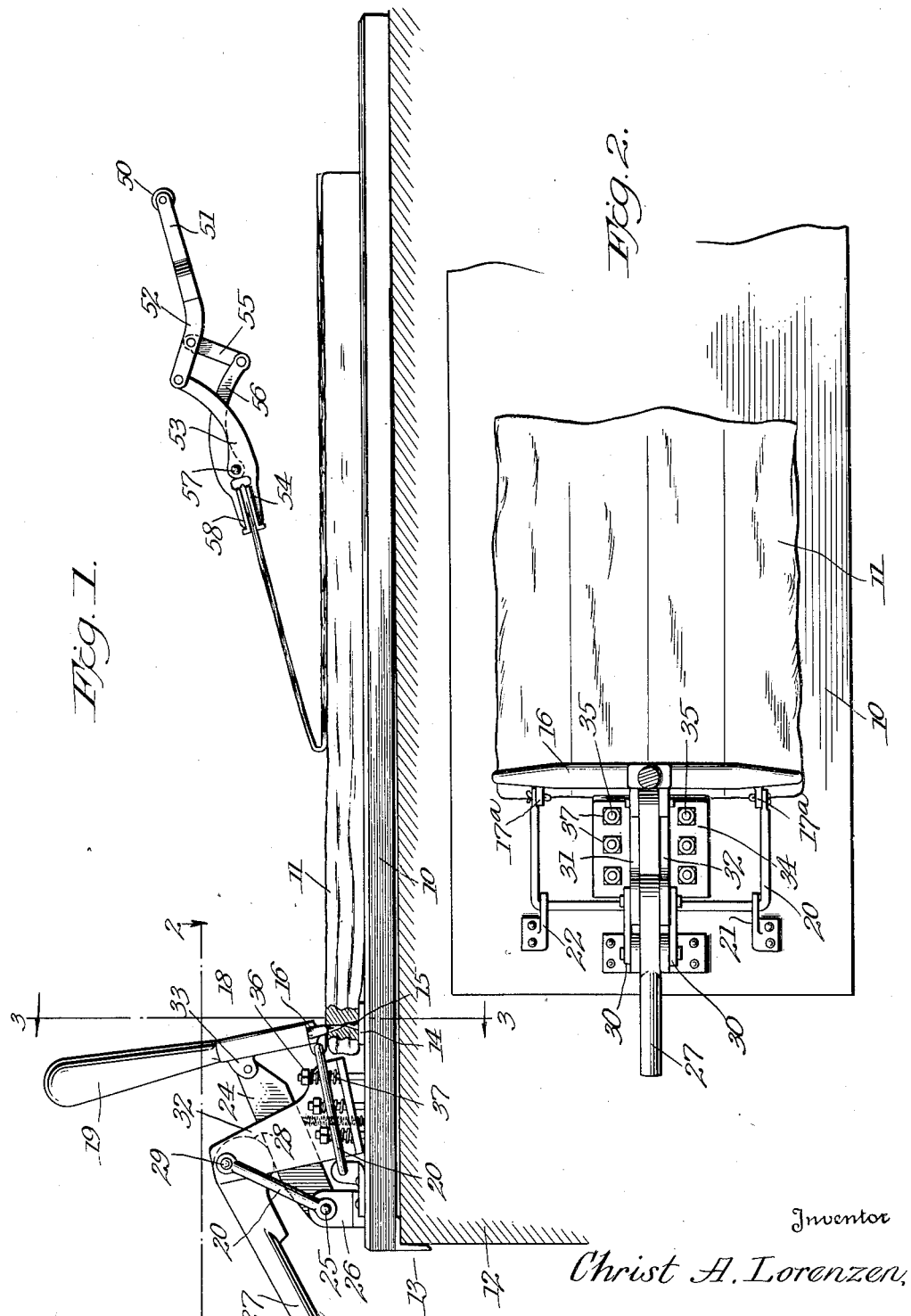

1,960,643

UNITED STATES PATENT OFFICE 1,960,643

BACON SKINNING MACHINE

Christ A. Lorenzen, Altoona, Pa.

Application April 1, 1932, Serial No. 602,555

7 Claims. (Cl. 146—130)

My invention is especially adapted for use in removing the rind from slabs or sides of smoked bacon and the like preparatory to slicing the same, although it is not necessarily restricted to use upon bacon.

An object of my invention is to provide an improved device for expeditiously removing the rind from bacon, without incurring the loss incident to the conventional practice of cutting the rind from the bacon.

Another object of the invention is to provide a more simple, more efficient, less cumbersome, less intricate, and cheaper device than is provided by the prior art for the purposes stated.

Another object of the present invention is to provide an improved clamp for securing a slab of bacon or the like to a baseboard in position to be stripped of its rind.

Another object is to provide resilient means which will limit the closing force which may be applied to the jaws of the clamp, so that mashing or bruising of the slab of bacon by applying too great a closing pressure to the clamp is impossible. Preferably, this is accomplished by mounting the operating lever for the clamp in a bracket which is displaceably secured to the baseboard so that the bracket may move, against the action of springs, to a position in which the operating lever cannot further close the jaws of the clamp. The arrangement of parts is preferably such that when a predetermined resistance is encountered during the closing movement of the jaws, a further movement of the operating lever results only in a displacement of its fulcrum against the action of springs, but imparts no further positive closing movement to the jaws. The displacement of the fulcrum of the operating lever may be an upward pivoting one, as shown in the specific embodiment illustrated herein, or any other movement which performs the desired function may be resorted to without departing from the invention.

Other objects and advantages of the invention will become apparent as the specification proceeds.

In the accompanying drawings, in which like reference characters refer to like parts throughout the several views, a specific embodiment of the invention is shown in which, Figure 1 is a side elevation of the clamp, baseboard, and tongs shown in operative relation to each other;

Figure 2 is a horizontal plan view, taken on lines 2—2 of Figure 1;

Figure 3 is a vertical sectional view taken on lines 3—3 of Figure 1;

Figure 4 is a plan of the tongs of my invention; and

Figure 5 is a detail of the jaws of the tongs shown in Figures 1, 3, and 4.

Referring to Figure 1, the baseboard 10 upon which a slab of bacon 11 is adapted to be secured, is mounted upon a conventional butcher's chopping block 12. The board is retained in position on the block by means of an angle iron strip 13 secured to the undersurface of the board adjacent one end thereof. The clamp of my invention is shown as being secured adjacent one end of the baseboard. This is a preferable arrangement, although it will be apparent that the elongated baseboard is unnecessary, and that the clamp might be mounted in operative relation to a counter or chopping block, and that the slab of bacon, or the like, might be supported directly thereby.

A lower stationary jaw member 14 is secured to the baseboard 10 by means of screws or the like, and is provided with a plurality of upwardly projecting prongs or teeth 15. These teeth project into the undersurface of the slab of bacon, and cooperate with similar teeth on the upper jaw to securely retain the slab in place. The upper jaw 16 is provided with downwardly extending teeth 17, and also with two rearwardly projecting ears or lugs 17a. The upper jaw also has a central upstanding post 18 and a handle 19, which will be described below. This jaw is pivotally connected to the baseboard by means of a substantially U-shaped yoke or link member 20 which is pivotally connected at its ends to the lugs 17a and also to lugs 21, 22 secured to the baseboard. It will be seen that this connection permits the movable jaw to be swung toward and away from the stationary jaw.

The upstanding central post 18 is provided with a pair of rearwardly projecting lugs 23 to which is pivoted bar 24. The other end of this bar is pivotally connected, by means of a pin 25 to a pair of upstanding lugs 26 secured to the baseboard. An operating lever 27 is provided with a projection 28 in the form of a cam face, and this portion of the lever is in engagement with the upper surface of the bar 24. Projecting from opposite sides of the head of the lever is an eccentrically mounted pin 29, and extending from this pin to the pin 25 are a pair of link members 30. The pin 29 also extends through appropriate openings in the upper part of two bracket members 31, 32, which are disposed adjacent the vertical side faces of the bar 24, and which are displaceably secured to the baseboard 10 by novel means, now to be described.

Each of these brackets 31, 32 is provided with an upwardly projecting portion to which the operating lever 27 is pivoted, as pointed out above. Each bracket is also provided with a laterally projecting, apertured flange 33 which normally rests upon the upper surface of the baseboard. Extending upwardly through the apertures 34 in these flanges are a plurality of pins or bolts 35 secured in the baseboard. The pins are provided with heads or nuts 36, and a coil compression spring 37 is disposed between each head and the portion of the flange therebelow.

It will thus be seen that, as the operating lever is moved from a substantially vertical position toward the left, as shown in Figure 1, the cam surface 28 will impart a downward force to the bar 24, which force in turn will be transmitted to the upstanding posts 18 and to the upper jaw 16 of the clamp. This force will be sufficient to embed the teeth 15 and 17 firmly into a slab of bacon which may have been previously inserted therebetween. Because of the yieldable mounting of the bracket 32, the downward force applied by the lever 27 to the upper jaw 16 will be insufficient to mash or bruise the slab. It will be apparent that when the resistance to downward movement of the jaw 16 and the bar 24 reaches a certain predetermined point, the continued movement of the lever 27 will cause the fulcrum pin 29 to exert an upward pressure on the brackets 31, 32, which is sufficient to overcome the resistance of the several coil springs 37, so that, instead of this continued movement of the lever imparting a continued pressure to the jaws, the brackets and the fulcrum pin will merely be displaced. Thus, when the pressure between the jaws reaches a certain predetermined, though safe, degree, continued movement of the operating lever merely serves to displace its fulcrum point without increasing the pressure at the jaws a substantial amount.

The specific form of tongs which are adapted to be used with the clamping device of my invention is important. These tongs are of the type generally referred to as "lazy-tongs" and include an operating handle 50 connected by appropriate straps 51 to a curved link 52. Pivoted to the end of the link 52 is a second link 53 provided with a jaw plate 54 adjacent its outer end. Near the point of the bend of the member 52, I pivotally secure one end of a short link member 55. The other end of this link is connected to one end of a member 56 which is pivoted at point 57 to the link member 53. A jaw plate 58 is secured thereto in cooperative relation to the plate 54. I preferably provide one of these plates with a plurality of teeth 59 and the other with apertures 60 into which the teeth project after they have passed through a strip of bacon rind or the like.

It will be apparent to one skilled in the art that the improved form of tongs of my invention is advantageous because of the fact that a strip of bacon rind is securely held by the teeth 59 projecting therethrough, and also by the firm clamping action of the plates 58, 54.

It will also be apparent that the particular link connection of the various parts of my tong arrangement is advantageous. A straight pull in the direction of the arrow in Figure 1 serves to draw the jaws of the tongs into tight clamping relation. A simple push in the opposite direction immediately opens the same.

In practicing the present invention, a slab of bacon is prepared for the clamp by stripping back a short section of the rind adjacent one end. The slab is then placed in the clamp, and the lever moved to the position shown in Figure 1 to securely hold the bacon in proper position. The rind should then be scored longitudinally of its length with a knife having a blade approximately one-eighth of an inch long so that the rind is cut through but the meat is not damaged. The ends of the strips of rind adjacent the clamp may then be grasped with the tongs and the various strips of rind successively removed. By this method, none of the meat of the bacon is removed and a considerable saving over the prior practice of removing bacon rind with a knife is accomplished.

It is to be understood that the disclosure of the drawings and this specification is illustrative only, and is not to be considered as restricting the scope of the invention as defined in the appended claims. Many variations of form, and modifications of details will readily occur to those skilled in the art, and all such changes as fall within the scope of the appended claims are to be considered within my invention.

I claim:—

1. A clamp for securing a slab of bacon or the like to a base in position to be stripped of its rind, said clamp comprising a stationary jaw, a movable jaw pivoted to swing to and from said stationary jaw, and an operating lever disposed in operative relation to said movable jaw to move the same toward said stationary jaw, said operating lever being fulcrumed in a supporting bracket, the fulcrum of which is displaceable against the action of resilient means to limit the effective operating force applied to said movable jaw by said lever.

2. A clamp for securing a slab of bacon or the like in position to be stripped of its rind, said clamp comprising a lower stationary jaw provided with upwardly projecting teeth, an upper movable jaw provided with downwardly projecting teeth, said movable jaw being pivoted to swing to and from said stationary jaw, and an operating lever disposed in operative relation to said movable jaw to move the same toward said stationary jaw, said operating lever being fulcrumed in a supporting bracket, the fulcrum of which is displaceable against the action of resilient means to limit the effective operating force applied to said movable jaw by said lever.

3. A clamp for securing a slab of bacon or the like in position to be stripped of its rind, said clamp comprising a stationary jaw, a movable jaw pivoted to swing to and from said stationary jaw, and an operating lever having a cam face disposed in operative relation to a part on said movable jaw to move the same toward said stationary jaw, said operating lever being fulcrumed in a supporting bracket, the fulcrum of which is displaceable against the action of resilient means to limit the effective operating force applied to said part on said movable jaw by said cam face on said lever.

4. A clamp for securing a slab of bacon or the like to a base in position to be stripped of its rind, said clamp comprising a lower stationary jaw, secured to said base, an upper movable jaw pivoted to said base to swing toward and away from said stationary jaw, and an operating lever fulcrumed in a displaceable bracket movably supported on said base, said lever having an operative connection with said upper jaw to depress the same toward said lower jaw, resilient means restraining movement of said bracket on said base but permitting displacement of said lever and its fulcrum in said bracket to limit the downward closing force applied to said movable jaw by said lever.

5. A clamp for securing a slab of bacon or the like to a base board in position to be stripped of its rind, said clamp comprising a lower stationary jaw secured to said base board, an upper movable jaw pivotally connected to said base board to swing toward and away from said lower jaw, a bar connected to said upper jaw and pivoted to said base board, a bracket adjacent said bar and yieldably mounted on said base board, a lever fulcrumed on said bracket and having a portion disposed in operative relation to said bar to depress the same and said movable jaw, said yieldable mounting of said bracket on said base board serving to permit upward displacement of said lever and said fulcrum to limit downward force imparting to said bar and to said movable jaw by said lever.

6. A clamp for securing a slab of bacon or the like to a base board in position to be stripped of its rind, said clamp comprising a lower stationary jaw secured to said base board, an upper movable jaw pivotally connected to said base board to swing toward and away from said lower jaw, a bar connected to said upper jaw and pivoted to said base board, a bracket disposed adjacent said bar and being mounted on said base board for upward movement therefrom against the action of resilient restraining means, a lever fulcrumed in said bracket above said bar and having a surface disposed in operative relation to said bar to depress the same and said movable jaw, said mounting of said bracket on said board serving to permit upward displacement of said lever fulcrum against the action of said resilient restraining means to relieve excessive downward force imparted to said bar by said lever.

7. A clamp for securing a slab of bacon or the like to a base board in position to be stripped of its rind, said clamp comprising a lower stationary jaw secured to said base board, an upper movable jaw pivotally connected to said base board to swing toward and away from said lower jaw, a bar connected to said upper jaw and pivoted to said base board, a bracket having a laterally extending apertured flange disposed adjacent said base board and an upwardly extending portion adjacent said bar, means for displaceably securing said bracket on said board, said means comprising an upwardly extending pin secured to said board and projecting through an aperture in said flange, and a coil compression spring surrounding said pin and operatively connected thereto adjacent its upper end and seated upon said flange at its lower end; a lever fulcrumed in said bracket above said bar and being disposed to depress said bar and said movable jaw; said bracket, upon the application of a predetermined force to said lever being displaceable upwardly against the action of said spring to lift said fulcrum from said bar and limit the operativeness of said lever to further depress said bar and said movable jaw.

CHRIST A. LORENZEN.